US 6,631,690 B2

(12) United States Patent
Mambretti

(10) Patent No.: US 6,631,690 B2
(45) Date of Patent: *Oct. 14, 2003

(54) PLANING, AIR-CONVEYING BOTTOM FOR BOATS

(76) Inventor: Riccardo Mambretti, Calle 3F No. 9, 29660 Nueva Andalucia - Marbella (ES)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/554,349

(22) PCT Filed: Feb. 18, 1998

(86) PCT No.: PCT/IT98/00029
§ 371 (c)(1),
(2), (4) Date: May 11, 2000

(87) PCT Pub. No.: WO99/32350
PCT Pub. Date: Jul. 1, 1999

(65) Prior Publication Data
US 2002/0157591 A1 Oct. 31, 2002

(30) Foreign Application Priority Data
Dec. 23, 1997 (IT) ............................. MI97A2861

(51) Int. Cl.[7] ................................. B63B 1/32
(52) U.S. Cl. .................................... 114/290
(58) Field of Search ................ 114/61.32, 61.33, 114/290, 291, 67 A, 67 R, 288, 289; D12/310, 311, 312

(56) References Cited

U.S. PATENT DOCUMENTS

| | | | | |
|---|---|---|---|---|
| 1,933,598 A | * | 11/1933 | Parker | 114/289 |
| D160,027 S | * | 9/1950 | Smith | D12/310 |
| D184,938 S | * | 4/1959 | Hupp | D12/312 |
| 3,126,856 A | * | 3/1964 | Fuller | 114/290 |
| 3,137,261 A | * | 6/1964 | Noe | 114/290 |
| 3,226,739 A | * | 1/1966 | Noe | 114/355 |
| 3,227,122 A | * | 1/1966 | Noe | 114/290 |
| 3,361,104 A | * | 1/1968 | Glass | 114/290 |
| 3,363,598 A | | 1/1968 | Mortrude | |
| 3,991,698 A | * | 11/1976 | Simpson | 114/288 |
| 4,004,542 A | | 1/1977 | Holmes | |
| 4,022,143 A | | 5/1977 | Krenzler | |
| 4,193,369 A | * | 3/1980 | Talamantes, Jr. | 114/290 |
| 4,409,922 A | * | 10/1983 | Mambretti | 114/283 |
| 4,672,905 A | * | 6/1987 | Pipkorn | 114/290 |
| 4,722,294 A | | 2/1988 | Bruning | |
| 4,862,817 A | * | 9/1989 | Hornsby, Jr. et al. | 114/67 A |
| 5,046,439 A | | 9/1991 | Goodson | |
| 5,237,953 A | * | 8/1993 | Mannerfelt | 114/288 |
| 5,476,061 A | * | 12/1995 | Ackerbloom | 114/290 |
| 6,216,622 B1 | | 4/2001 | Lindstrom et al. | 114/61.33 |

FOREIGN PATENT DOCUMENTS

| | | |
|---|---|---|
| AU | 444 598 B | 1/1974 |
| EP | 0 033 563 A | 8/1981 |
| JP | 62-247994 * | 10/1987 .............. 114/61.32 |

* cited by examiner

*Primary Examiner*—S. Joseph Morano
*Assistant Examiner*—Andrew Wright
(74) *Attorney, Agent, or Firm*—Michael J. Striker

(57) ABSTRACT

A V-bottom for fast motor boats with longitudinal reaction walls reacting to a lateral trust from an air-water mixture which are substantially parallel and symmetrical in relation to keel is formed so that the reaction walls are the walls of flat-based grooves in a bottom joined to a flat base by a widely curving radius, or the reaction walls are the walls of ribs having a substantially trapezoidal cross-section and a flat horizontal lesser external base.

10 Claims, 7 Drawing Sheets

PLANING, AIR-CONVEYING BOTTOM FOR BOATS

Figure 1:
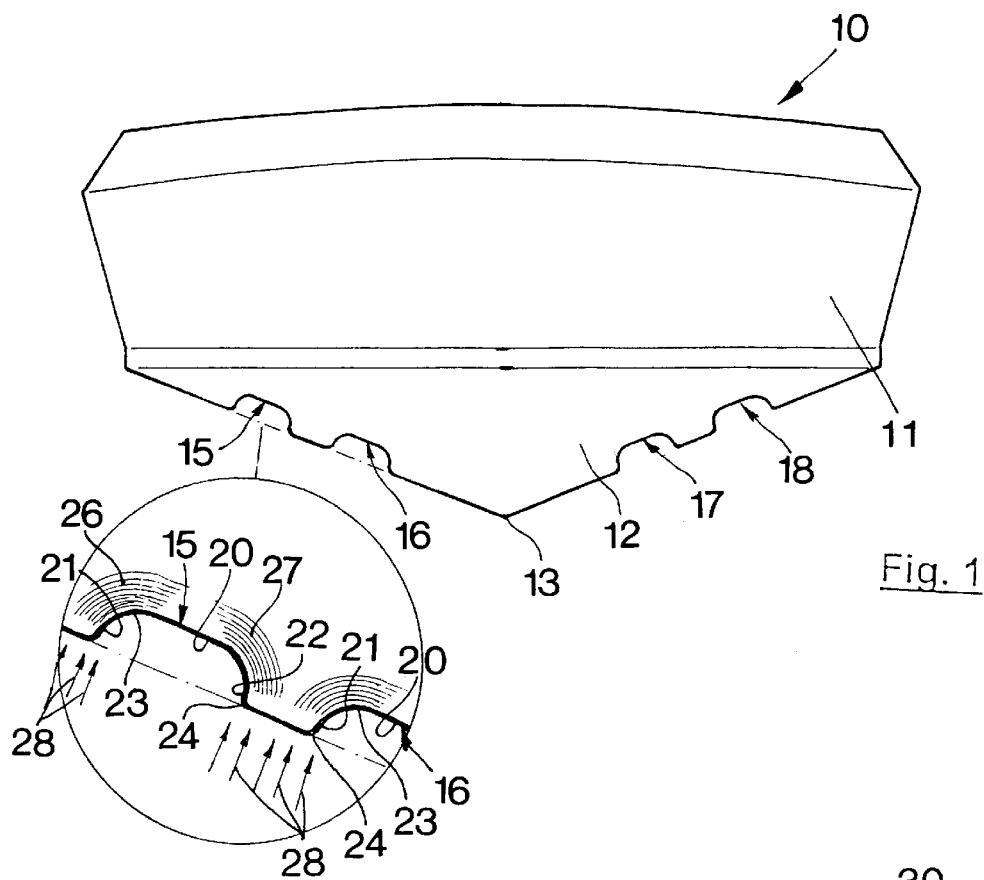

In the case of a V-bottomed boat, as speed increases, the supporting surface, which is the wetted surface, is known to become reduced thus lessening resistance to the boat's forward movement.

The mass of water compressed by the moving boat is turned from its smooth state in directions orthogonal to its surface producing reactions opposing the motion, in practice constituting the lift of the boat.

Due to the boat's motion, this mass tends to acquire a high degree of energy creating a considerable raising force.

The directions taken by this divided mass, in actual fact composed of compressed air and water, vary according to the flare of the bottom, to the trim and speed of the boat and to other factors.

It is known that by fitting longitudinal runners to the bottom, greater lift is obtained for the boat at its impact with the waves, not only forward impact but also that after the boat has left the surface of the water, for greater transversal and longitudinal stability as well as for higher speed since an increase in applied power progressively reduces surface friction.

With runners, however, speed can only be increased to a point depending both on the weight of the boat and on the power applied to it, as the water tends to escape sideways from the keel more easily.

The V-shaped bottom in particular is only partly satisfactory as beyond a certain limit the wetted or friction-creating surface cannot be reduced unless excessive power is applied which makes for uneconomic costs and consumption in relation to the performance achieved.

The above invention appreciably increases lift in relation to speed, greatly improving performance, strengthening the structure of the boat and offering other advantages as will now be explained.

Subject of the invention is a V-shaped bottom for fast motorboats, having in it a number of longitudinal means substantially parallel and symmetrical to the keel, with walls that react to the lateral thrust from the water-air mixture tending to move from the keel outwards to the sides of the bottom.

The walls of said means of reaction join the bottom in wide curves; they extend from the stern approximately as far as the bows, or else those nearest the keel can extend from a position midway between stern and the centre of the boat practially as far as the bows and, for the greater part of their length, the cross section will be of a constant shape.

The cross section of the means of reaction nearest the keel may be of a different shape from that of the means farthest from it.

There may be two, four or some other number of means of reaction.

In one type of execution the means of reaction consist of grooves.

The base of these grooves is substantially flat, their walls stand at substantially 90° and are joined to the bottom in wide curves.

The curve is advantageously an arc of a circle with a radius equal to the height of the walls.

In one type of execution the grooves have a flat base and walls at 90° with a wide curve on the wall nearest the keel, or on the wall farthest from said keel.

The rims of the grooves are preferably rounded.

In one advantageous type of execution, between one groove and the next the surface of the bottom lies at an angle outwards from the rim of a groove nearest to the keel, and in a direction opposite to the keel, which angle produces, in the adjacent groove farther from the keel, a wall height of said groove, nearer to the keel, higher than the opposite wall.

Cross section of the grooves may advantageously form an arc of a circle.

The reference U.S. Pat. No. 4,722,294 discloses longitudinal channels on the bottom of the keel of a hydroplane, these being symmetrical and parallel to the centre line of the keel, width as W, and having a substantially semicircular cross section of radius R open towards the outside, with width W established by the formula W=2R.

It follows that there can be no flat zone on the base of the keel between the opposite walls of said channels.

The purpose of these channels is to form a "water guide" to increase stability of the boat avoiding side slippage and in particular a reduction of the tacking radius, but they cannot appreciably increase lift especially in relation to speed.

The return drop of the keel into the water after passing a wave that lifted it above the surface will even so be precipitate and produce shocks and bouncing.

In another type of execution the means of reaction are ribs, one effect of which is to strengthen the structure so as better to withstand thrust from the air-water mixture. Cross section of said ribs is substantially trapezoidal with a flat external lesser base substantially orthogonal to the boat's longitudinal geometrical plane of symmetry.

Advantageously the sides of the ribs lie at an angle of substantially 45° or of 90° and join the surface of the bottom in a wide curve.

The edges of the ribs are bevelled.

The invention offers evident advantages.

The mass of water mixed with air, thrust by the keel towards the walls of the means of reaction, produces an important factor of lift partly due to the effect of the wide curves joining said walls to the outer surface of the bottom.

In particular the flow of water-air from bows to stern and the considable increase in its density determine a much higher lift especially in relation to the speed.

The particles of water slide more easily over the bottom because of the cushion of air mixed with water.

Especially in the case of means of reaction with strongly joined walls, in addition to greater containment of the mass of water supporting planing, the drop of the boat after the bottom rises above the water is made smoother and easier.

Water thrust is spread more evenly over a curved surface resulting in improved performance.

The pronounced curve at the join between the walls of the means of reaction and the bottom of the boat greatly improves structural strength and therefore higher resistance to stresses.

Characteristics and purposes of the invention will be made still clearer by the following examples of its execution illustrated by diagrammatically drawn figures.

FIG. 1 Motorboat having four flat-based grooves in the bottom with widely curved walls, view from the rear.

Figure 2:
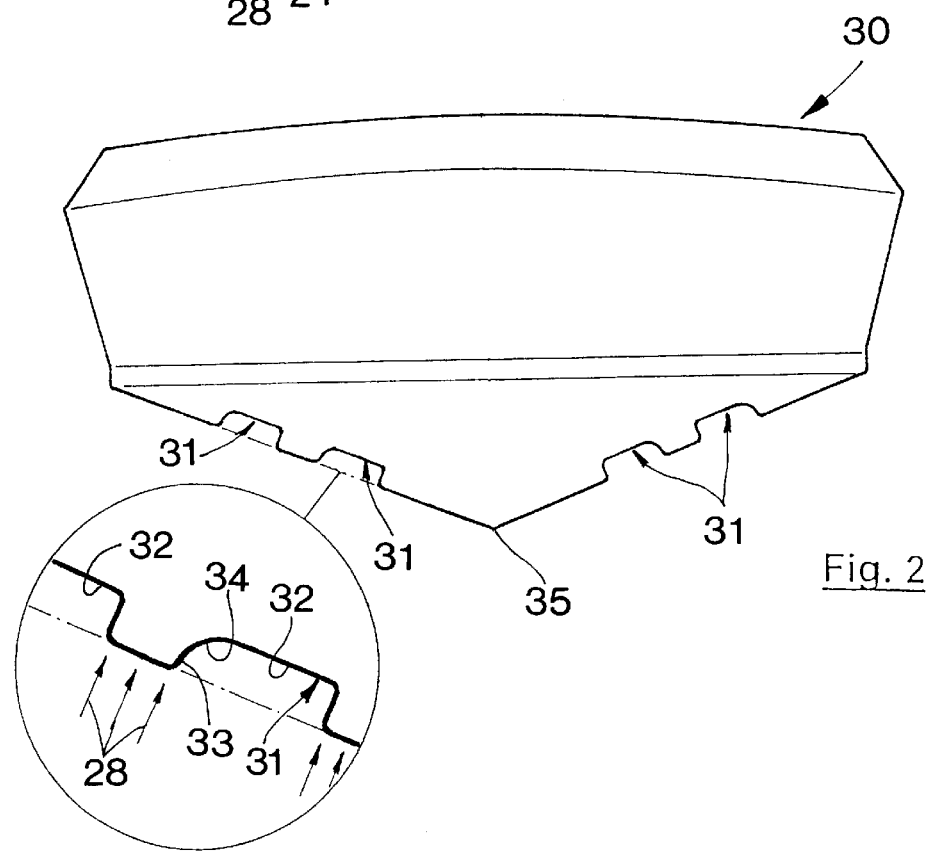

FIG. 2 Motorboat having four flat-based grooves in the bottom, the wall on the keel side being widely curved, rear view.

Figure 3:
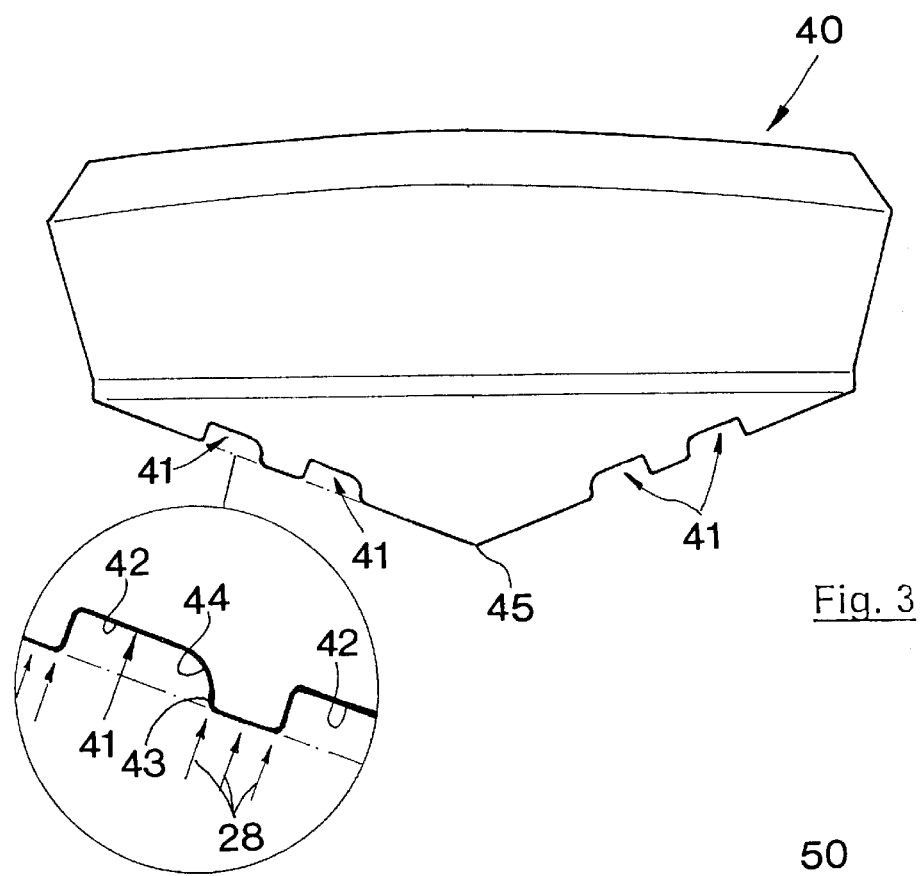

FIG. 3 Motorboat having four flat-based grooves in the bottom, the wall farthest from the keel being widely curved, rear view.

Figure 4:
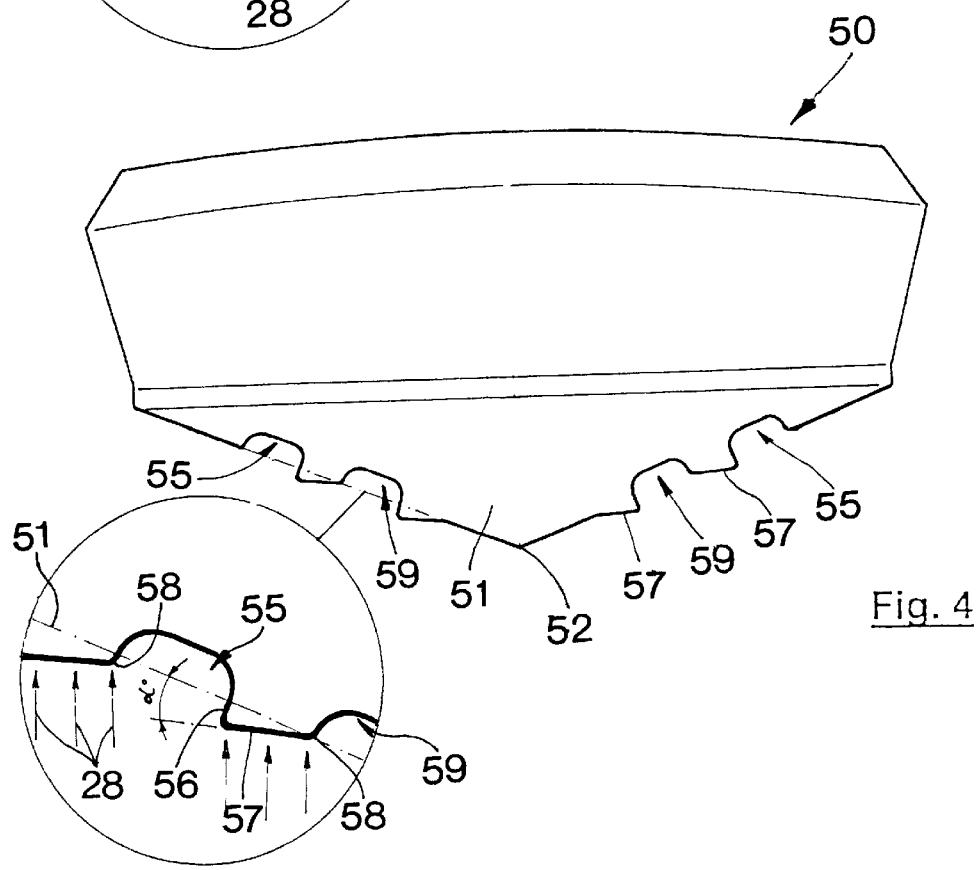

FIG. 4 Motorboat having four flat-based grooves in the bottom, the surface between one groove and another being at an angle from the rim of the outer groove and towards the adjacent groove, rear view.

Figure 5:
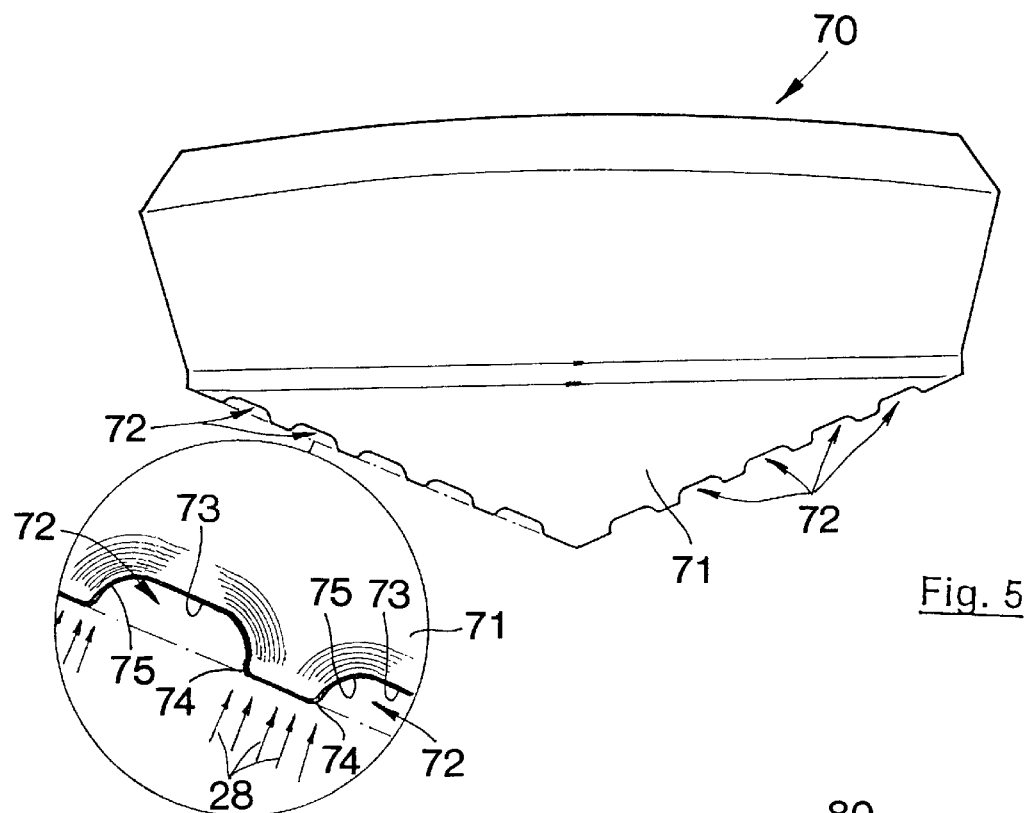

FIG. 5 Motorboat having several flat-based grooves in the bottom with walls joined at wide curves, view from the rear.

Figure 6:
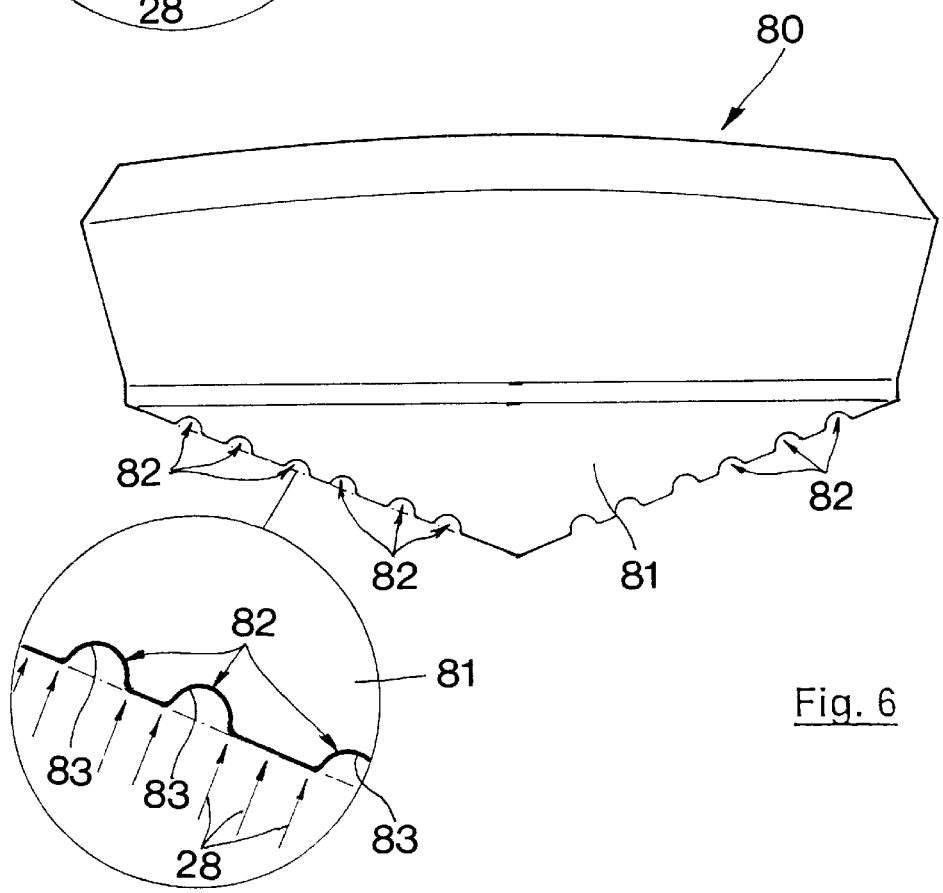

FIG. 6 Motorboat having in its bottom several grooves whose bases curve in the arc of a circle, view from the rear.

Figure 7:
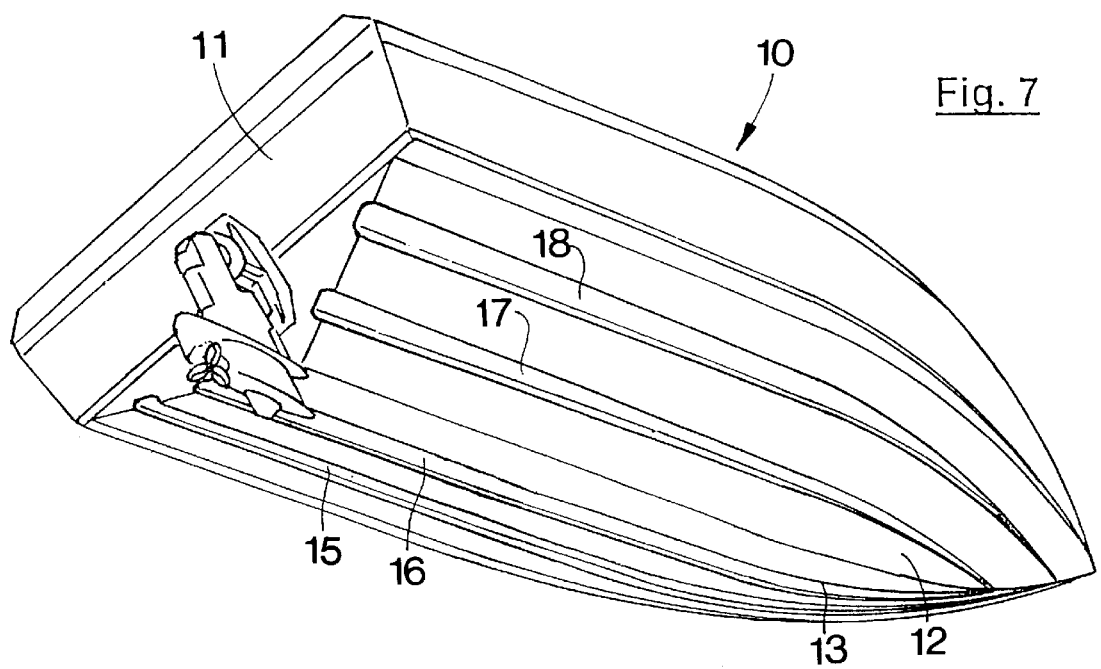

FIG. 7 Rear perspective from below of the motorboat in FIG. 1.

Figure 8:
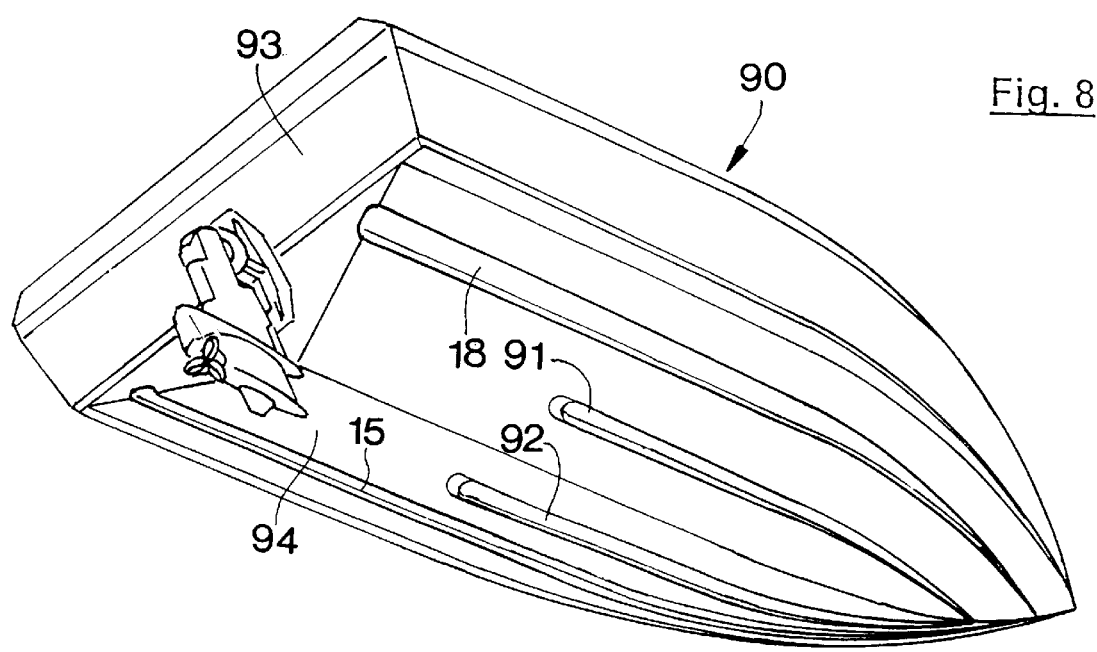

FIG. 8 Rear perspective from below of the motorboat in FIG. 1 with internal grooves starting at a certain distance from the stern.

Figure 9:
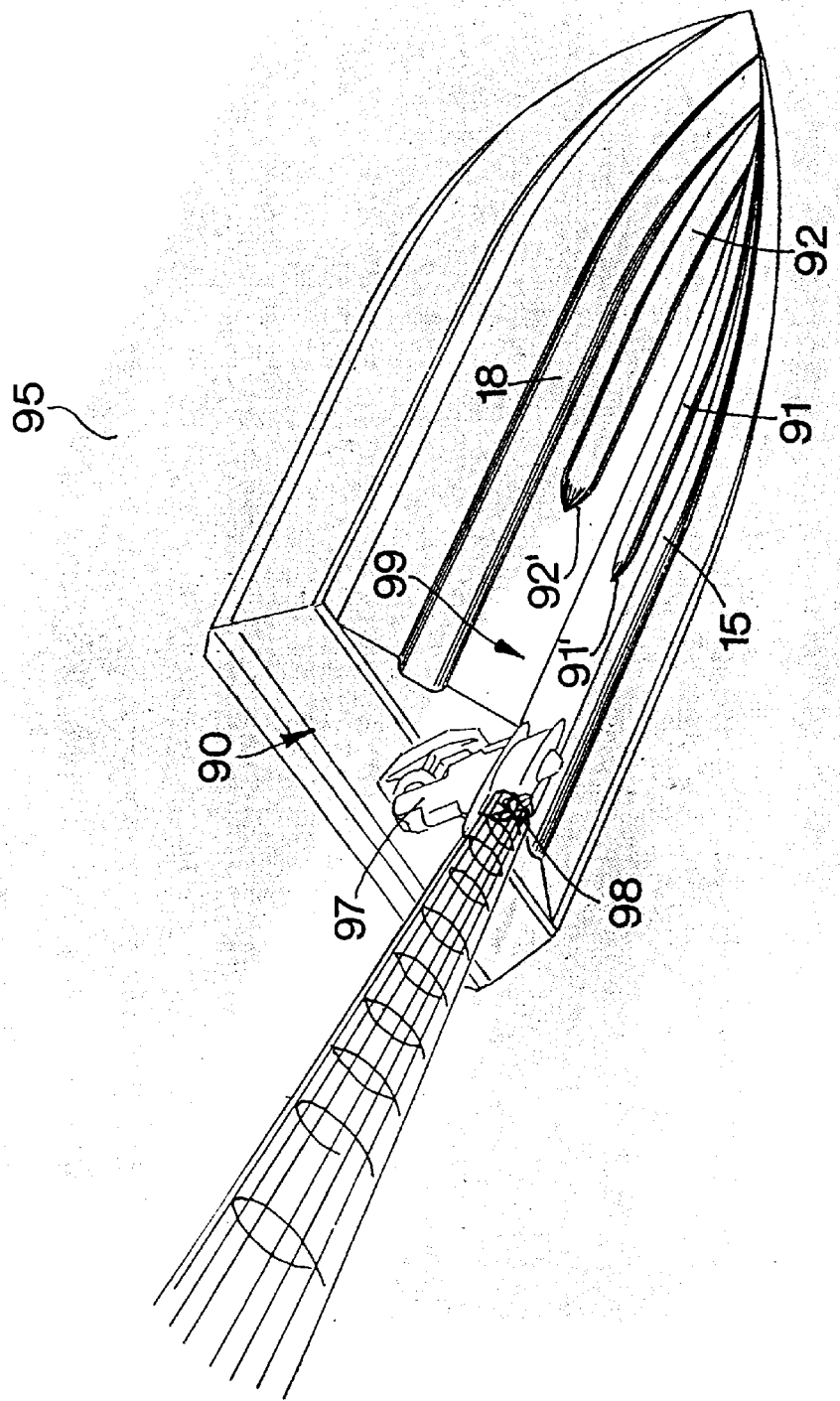

FIG. 9 Rear perspective from below of the motorboat in FIG. 8 moving over the water.

Figure 10:
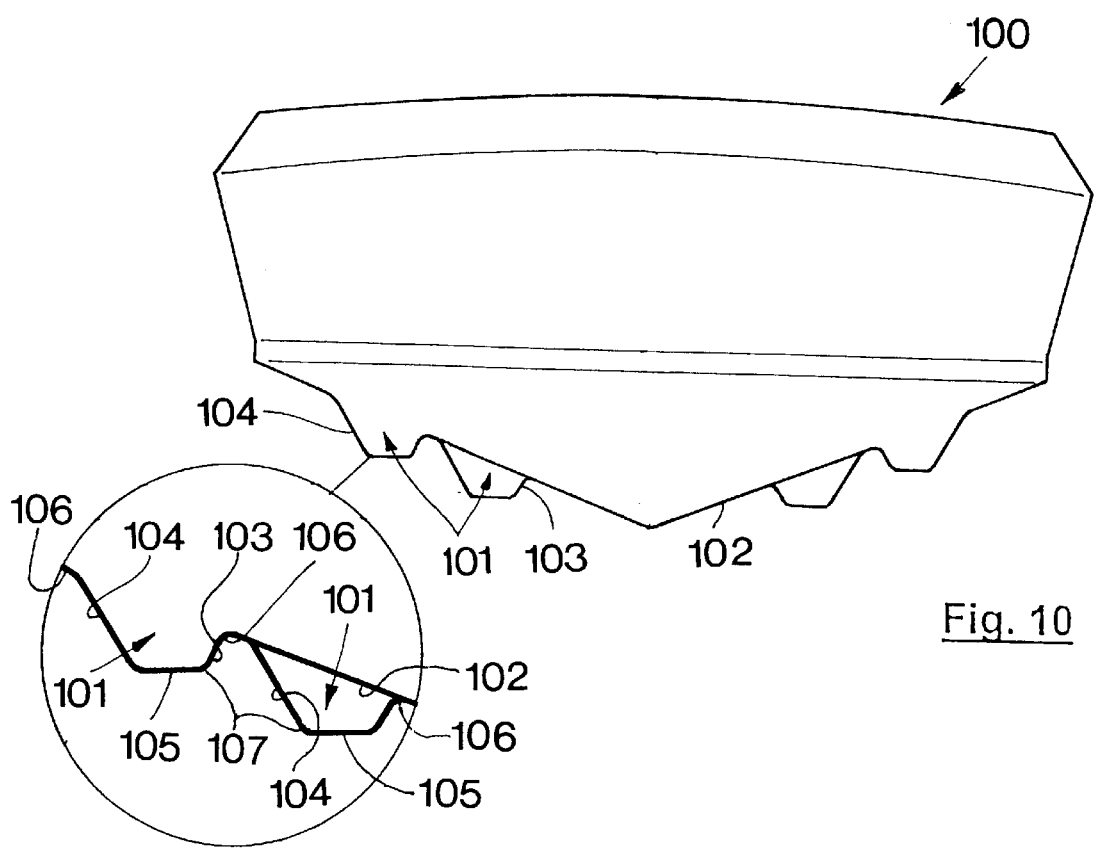

FIG. 10 Motorboat having on its bottom four ribs with walls at 45°, view from the rear.

Figure 11:
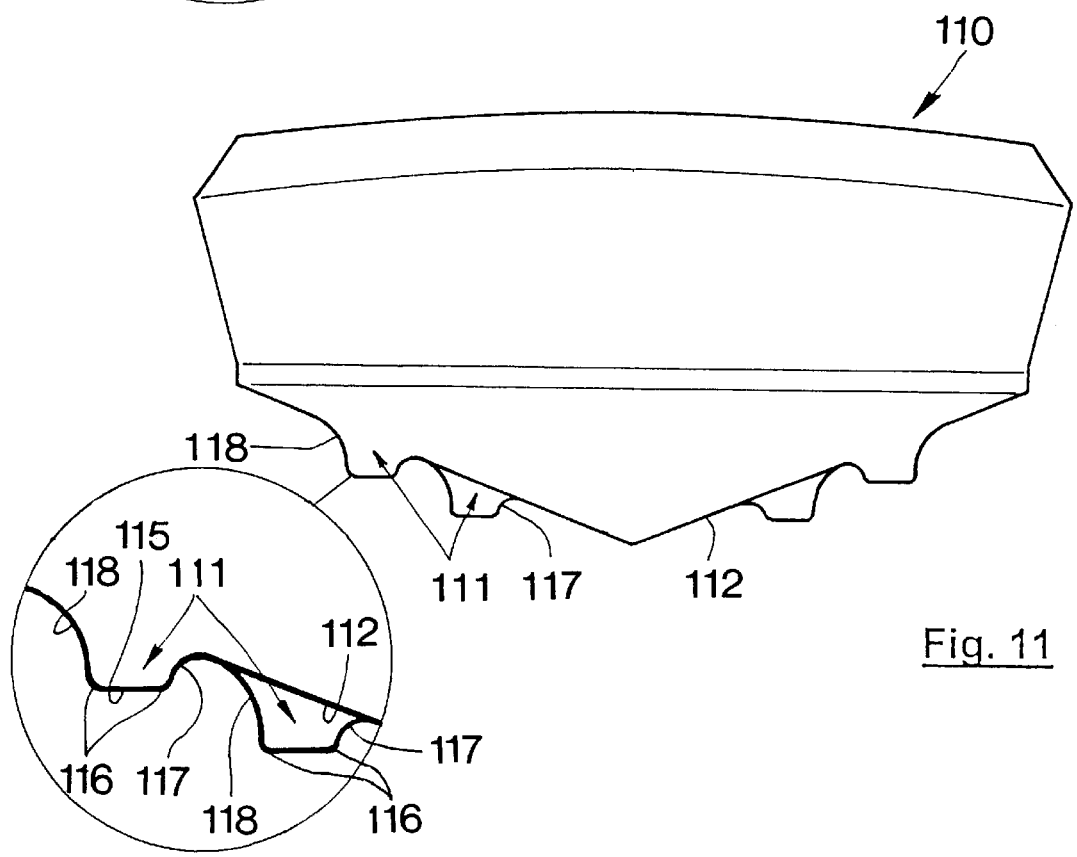

FIG. 11 The motorboat in FIG. 10 with rib walls joining the bottom of the boat in a wide curve, view from the rear.

Figure 12:
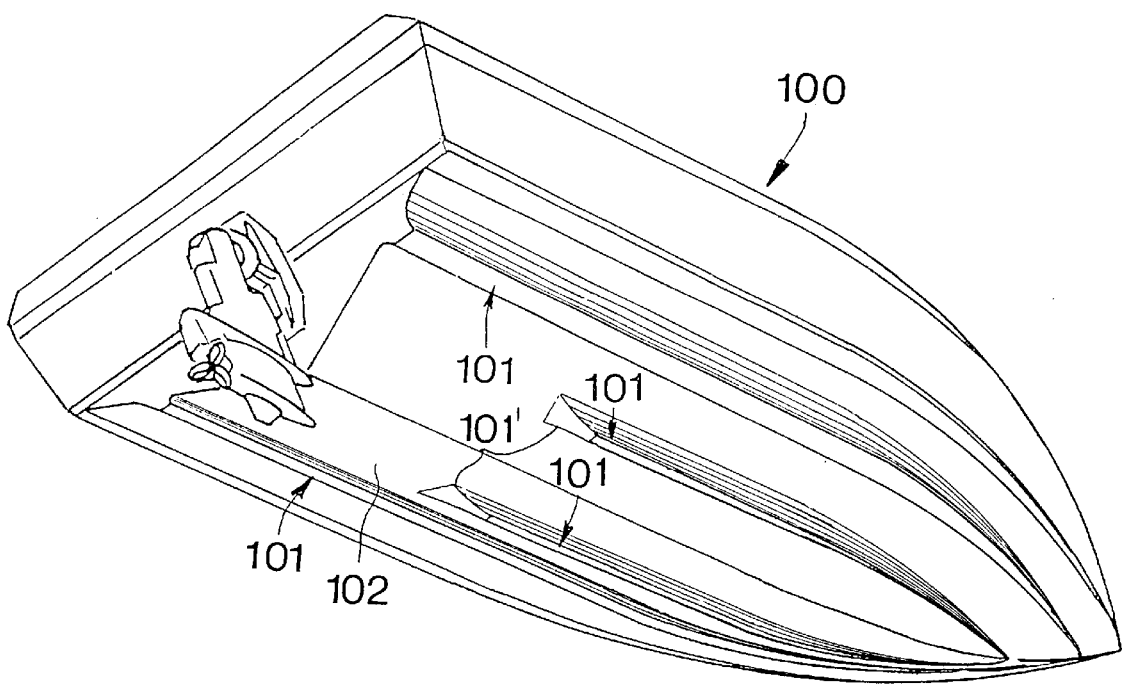

FIG. 12 The motorboat in FIG. 11 with internal ribs on its bottom starting from a certain distance from the stern, rear view from below.

The motorboat 10 with stern 11, V-shaped bottom 12, keel 13 presents four grooves 15–18 substantially parallel to the keel in the surface of said bottom.

Said grooves have flat bases 20 and walls 21, 22 joined to the bottom by curves 23 with slightly rounded rims 24.

Clearly, therefore, the water-generated pressure, indicated by arrows 28, sets up stresses 26, 27 on the walls of the grooves, strongly reinforced by the joins 23.

FIG. 2 shows a motorboat 30 similar to the preceding one, with grooves 31 substantially the same as before, except that only the wall 33 farthest from the keel 35, has a widely curving join 34 to its flat base 32.

FIG. 3 illustrates a motorboat 40 similar to the preceding ones, with grooves 41 substantially the same as above except that only the wall 43 nearest to the keel 45 has a widely curving join 44 to its flat base 42.

FIG. 4 shows a motorboat 50 similar to that in FIG. 1, with substantially equal grooves 55 and 59.

The wall 56 of groove 55 nearest to the keel 52 projects onto the bottom 51; this is due to the angle α of the surface 57 that extends between one groove and another and therefore from the rim 58 of the adjacent groove 59 nearest to the keel 52, outwards and towards said wall 56.

FIG. 5 shows a motorboat 70 with a bottom 71 in whose surface is a series 72 of grooves with flat bases 73 and walls 74 joined to the bottom by wide curves 75.

FIG. 6 illustrates a motorboat 80 with bottom 81 in whose surface is a series of grooves 82 with bases 83 shaped as an arc of a circle.

FIG. 7 shows a perspective view of the motorboat 10 in FIG. 1 seen from below. All grooves 15–18 extend substantially from stern to bows.

FIG. 8 shows a motorboat 90 with stern 93 and bottom 94 similar to the motorboat 10 already described with substantially equal grooves, except that the two inner grooves 91, 92 start at a certain distance from the stern and are tapered 91' and 92'.

FIG. 9 substantially illustrates the same motorboat as in FIG. 8 with a screw 98 propeller 97 for moving it in the water 95.

The small extension of triangular surface of immersion 99 during movement at high speed can be clearly seen.

FIG. 10 illustrates a motorboat 100 with ribs 101 that project from the bottom 102, the cross section being of a substantially constant trapezoidal shape, with its lesser base 105 and walls 103 and 104 at 45°.

These walls meet the bottom at joins 106 and have rounded rims 107.

FIG. 11 shows a motorboat 110 similar to the above, having trapezoidal ribs 11 with a lesser base 115, their walls joining the bottom surface 112 in wide curves 117, 118 and their rims 116 being rounded.

FIG. 12 illustrates a motorboat 120 substantially similar to that in FIG. 11 except that the two internal ribs 121 start from a certain distance from the stern and are tapered 121'.

What is claimed is:

1. Hull for fast motor boats, comprising a V-shaped hull bottom surface extending substantially the length of the boat, longitudinal reaction walls which reacting to a lateral thrust from an air-water mixture and are substantially parallel and symmetrical in relation to a keel, characterized in that the reaction walls are walls of grooves each having two walls and a base, and in each of the grooves the base being flat, the two walls being at 90° to the base, and the two walls being each joined to the base by a widely curving radius, the grooves being recessed inwards from the V-shaped hull bottom surface.

2. Hull for fast motorboats as in claim 1, characterized in that the grooves extend along a whole length of the keel.

3. Hull for fast motorboats as in claim 1, characterized in that the grooves nearest to the keel extend from an intermediate area between a stern and a center of a boat nearly as far as a bow.

4. Hull for fast motorboats as in claim 1, characterized in that a shape of a cross section of the grooves is constant.

5. Hull for fast motorboats as in claim 1, characterized in that a shape of a cross section of the grooves is substantially constant for a great part of their length.

6. Hull for fast motorboats as in claim 1, characterized in that cross sections of the grooves nearest to a keel are different from those of farthest grooves.

7. Hull for fast motorboats as in claim 1, characterized in that there are two grooves.

8. Hull for fast motorboats as in claim 1, characterized in that there are four grooves.

9. Hull for fast motorboats as in claim 1, characterized in that a radius of curvature between the walls and the base of the grooves is substantially equal to a height of said walls.

10. Hull for fast motorboats as in claim 1, characterized in that, in each groove, a height of the wall nearest to the keel is greater than a height of an opposite wall.

* * * * *